United States Patent
Yoshida et al.

(10) Patent No.: US 8,695,024 B2
(45) Date of Patent: Apr. 8, 2014

(54) DISC CHANGER WITH DETACHABLE OPTICAL DISC STORAGE MAGAZINE FOR STORING MULTIPLE OPTICAL DISCS

(75) Inventors: Takashi Yoshida, Omitama (JP); Osamu Kawamae, Kawasaki (JP); Yuji Ishikawa, Hitachinaka (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 70 days.

(21) Appl. No.: 13/034,494

(22) Filed: Feb. 24, 2011

(65) Prior Publication Data

US 2012/0079510 A1 Mar. 29, 2012

(30) Foreign Application Priority Data

Sep. 29, 2010 (JP) ................................. 2010-218057

(51) Int. Cl.
*G11B 17/22* (2006.01)
(52) U.S. Cl.
USPC .......................................................... 720/615
(58) Field of Classification Search
USPC ....................... 720/619–622, 721; 369/30.38, 369/30.51–30.55, 30.57
See application file for complete search history.

(56) References Cited

U.S. PATENT DOCUMENTS

| | | | | |
|---|---|---|---|---|
| 4,855,980 A | * | 8/1989 | Hug et al. | 369/30.49 |
| 5,050,148 A | * | 9/1991 | Simpson | 369/30.77 |
| 5,414,679 A | * | 5/1995 | Menke | 369/30.87 |
| 6,005,744 A | * | 12/1999 | Terashima | 360/92.1 |
| 6,014,353 A | * | 1/2000 | Kong et al. | 369/30.84 |
| 6,169,713 B1 | * | 1/2001 | Silverstein | 369/30.79 |
| 6,587,406 B1 | | 7/2003 | Nakamichi | |
| 7,571,449 B2 | * | 8/2009 | Kuo | 720/619 |
| 8,276,170 B2 | * | 9/2012 | Douglass et al. | 720/617 |

FOREIGN PATENT DOCUMENTS

| | | |
|---|---|---|
| JP | UM 4-26461 | 3/1992 |
| JP | 07-85568 | 3/1995 |
| JP | 8-17123 | 1/1996 |
| JP | 08-087810 | 4/1996 |
| JP | 09-320168 | 12/1997 |
| JP | 09320168 | * 12/1997 |
| JP | 2000-48456 | 2/2000 |
| JP | 2000048456 | * 2/2000 |

OTHER PUBLICATIONS

Office action in Corresponding foreign Chinese Patent Application No. 201110048681.5, mailed Dec. 13, 2013.

* cited by examiner

*Primary Examiner* — Angel Castro
(74) *Attorney, Agent, or Firm* — Antonelli, Terry, Stout & Kraus, LLP.

(57) ABSTRACT

A magazine detachably installed in a main body of a disc changer is divided into sections by partitions for storing a large number of optical discs. The magazine is provided with a belt set around rollers, which carries the optical disc in contact with the belt. In the disc changer, the belt is rotated by a gear of the roller, which is engaged with an external drive gear for taking the optical disc through rotating movement. Among the optical discs which have been taken, a target optical disc opposite the slit of the disc control plate passes through the slit, and the other optical discs stop while abutting against the disc control plate. The optical disc which has passed through the slit is inserted into disc carriage rollers, and further carried to the drive for recording/reproducing.

15 Claims, 11 Drawing Sheets

DISC CHANGER WITH DETACHABLE OPTICAL DISC STORAGE MAGAZINE FOR STORING MULTIPLE OPTICAL DISCS

BACKGROUND

The present invention relates to a magazine which is detachably installed in a main body of a disc changer for storing a large number of optical discs, and the disc changer which takes the optical disc from the magazine for recording or reproducing data.

Japanese Unexamined Patent Publication No. 8-87810 (Patent Document 1) introduces the magazine which stores a large number of the optical discs and the disc changer which records and reproduces the data as described above.

Japanese Unexamined Patent Publication No. 8-87810 discloses the disc changer which is formed of the rack for storing a large number of discs, while holding each outer circumference of the discs, and the disc carriage unit for carrying the disc from the rack to the record/reproduction device while holding the outer circumference of the disc.

The disc changer as disclosed in Japanese Unexamined Patent Publication No. 8-87810 is required to keep a wide interval between adjacent discs for the purpose of allowing one of the discs in the rack to be taken out while holding the outer circumference of the disc. There has been a problem in the structure that the interval between the adjacent discs cannot be reduced, and accordingly, those discs cannot be stored in highly densely manner.

SUMMARY

The present invention provides a magazine which is capable of storing discs in a highly densely manner by reducing the interval between adjacent discs, and a high-speed accessible compact disc changer with high capacity for recording or reproducing data of the optical disc taken from the magazine.

Examples of the present invention will be described hereinafter.

For example, as one of exemplary embodiments, an optical disc storage magazine is detachably installed in a disc changer which stores a plurality of optical discs, and includes a disc carriage belt in contact with each outer circumferential surface of the plurality of optical discs stored in the magazine for rotating and moving. This makes it possible to reduce the storage interval between the discs to provide the effect which allows storage of the discs in highly densely manner. Additionally, the effect for immobilizing the disc during the carriage may also be provided.

For example, for each disc, a disc moving mechanism is provided opposite the disc carriage belt which holds the optical disc in contact with the outer circumferential surface so that the optical disc is moved in contact with or away from the disc carriage belt. The aforementioned structure provides the effect which allows the user to select the disc to be taken from the magazine, and prevents generation of abrasion powder that may make flaw on the disc by keeping the discs static. Furthermore, the disc may be immobilized during carrying operation.

For example, a groove is formed in the disc carriage belt at a position in contact with the outer circumferential surface of the optical disc. This makes it possible to prevent the contact between the leaning disc and the partition.

For example, a groove is formed in the disc carriage belt at a position in contact with the outer circumferential surface of the optical disc. Further a groove is formed in a member of the optical disc storage magazine at a position opposite the groove formed in the disc carriage belt, which is in contact with the outer circumferential surface of the optical disc. This makes it possible to omit the partition, and accordingly, prevent the contact between the disc and the partition.

For example, the optical discs are stored in sections formed by dividing the optical disc storage magazine with partitions. This makes it possible to prevent the optical disc from leaning, that is, the contact with the adjacent disc. Furthermore, the partition serves as a guide for inserting the optical disc in the optical disc storage magazine, resulting in easy insertion.

For example, the partition includes protrusions at a position opposite a non-recordable area of the optical disc at both sides and a semicircular portion of a storage terminal end of the partition in a moving direction of the optical disc in the optical disc storage magazine. This makes it possible to prevent the disc recording surface from being damaged, and to reduce the frictional load to the disc.

For example, the disc carriage belt is externally driven and rotated. It may be detachably installed in the main body of the disc changer.

For example, the disc moving mechanism is externally driven. This allows the user to select the disc to be taken from the magazine. Furthermore, it may be detachably installed in the main body of the disc changer.

For example, a cover is attached to an insertion portion of the optical disc storage magazine through which the optical disc is inserted. This makes it possible to prevent intrusion of grit and dust upon storage.

The present invention provides a disc changer having an optical disc storage magazine detachably installed in a main body of the disc changer, and a recording/reproducing device. The optical disc storage magazine stores the optical discs, and includes a disc carriage belt in contact with each outer circumferential surface of the plurality of stored optical discs to be rotated and moved.

The disc changer includes a disc control plate with a slit which allows only one of the optical discs, which is disposed between the optical disc storage magazine and the recording/reproducing device, and a disc carriage roller for carrying the optical disc. Among the plurality of optical discs taken from the optical disc storage magazine through rotating movement via the disc carriage belt, the optical disc which has passed through the slit is carried to the recording/reproducing device with the disc carriage roller for recording/reproducing, and the other optical discs are stopped while abutting against the disc control plate. This makes it possible to accelerate the disc exchanging operation while reducing size and thickness.

For example, a plurality of the optical disc storage magazines is arranged in parallel. This makes it possible to increase the memory capacity, and sequentially switch the optical disc storage magazine, resulting in seamless recording/reproducing.

For example, the disc control plate has a plurality of slits opposite the optical disc storage magazines. The disc changer includes the disc carriage rollers for carrying the optical discs which have passed through the slits, and the recording/reproducing devices for recording/reproducing the optical discs which have been carried by the disc carriage rollers. The parallel running of the recording/reproducing device is effective for accelerating the recording/reproducing rate.

For example, a carriage on which the disc control plate, the disc carriage roller and the recording/reproducing device are mounted is provided. The carriage is moved to locate the slit of the disc control plate at a position opposite the optical disc stored in the optical disc storage magazine. This makes it possible to record/reproduce all the optical discs stored in the optical disc storage magazine using the recording/reproducing device.

For example, a carriage on which the optical disc storage magazine is mounted is provided. The carriage is moved to locate the optical disc stored in the optical disc storage magazine at a position opposite the slit of the disc control plate. This makes it possible to record/reproduce all the optical discs stored in the optical disc storage magazine using the recording/reproducing device.

The disc changer includes an optical disc storage magazine detachably installed in a main body of the device and a recording/reproducing device. The optical disc storage magazine stores a plurality of optical discs, and includes a disc carriage belt in contact with each outer circumferential surface of the plurality of stored optical discs for rotating movement, and a disc moving mechanism provided opposite the disc carriage belt which holds the optical disc in contact with the outer circumferential surface so that the optical disc is moved in contact with or away from the disc carriage belt. A disc carriage roller for carrying the optical disc is provided between the optical disc storage magazine and the recording/reproducing device. The optical disc in contact with the disc carriage belt is taken from the optical disc storage magazine by the disc moving mechanism through rotating movement via the disc carriage belt, and the optical disc is carried to the recording/reproducing device through the disc carriage roller for recording/reproducing. This makes it possible to omit the disc control plate, thus accelerating the disc exchanging operation, and reducing size and thickness.

For example, a plurality of the optical disc storage magazines is arranged in parallel. This makes it possible to increase the memory capacity, and sequentially switch the magazine, resulting in seamless recording/reproducing.

For example, the structure is provided with a plurality of the disc carriage rollers provided opposite the optical disc storage magazine, and the recording/reproducing device for recording/reproducing the optical disc which has been carried by the disc carriage roller. The parallel running of the recording/reproducing device is effective for accelerating the recording/reproducing rate.

For example, a carriage on which the disc carriage roller and the recording/reproducing device are mounted is provided. The carriage is moved to locate the disc carriage roller to the position opposite the optical disc stored in the optical disc storage magazine. This makes it possible to record/reproduce all the optical discs stored in the optical disc storage magazine using the recording/reproducing device.

For example, a carriage on which the optical disc storage magazine is mounted is provided. The carriage is moved to locate the optical disc stored in the optical disc storage magazine to a position opposite the disc carriage roller. This makes it possible to record/reproduce all the optical discs stored in the optical disc storage magazine using the recording/reproducing device.

For example, a roller portion of the disc carriage roller, which is in contact with a surface of the optical disc is divided into a plurality of sections. Even if the roller runs over the ring-like protrusion on the inner circumference of the optical disc, sufficient carriage capacity is ensured by the other roller in contact with the optical disc surface.

For example, a drive roller of the disc carriage roller is brought into contact with a non-recordable surface, and a driven roller is brought into contact with a recordable surface. No slippage occurs between the driven roller and the recording surface, thus preventing damage of the recording surface.

The invention provides a thin magazine capable of storing optical discs in a highly densely manner by reducing the interval between adjacent discs, and a high-speed accessible compact disc changer with high capacity for recording/reproducing the data of the optical disc taken from the magazine.

DESCRIPTION OF THE PREFERRED EMBODIMENTS

Exemplary embodiments of the present invention will be described referring to the drawings. The term "a large number of optical discs" or "a plurality of optical discs" represents seven or eight optical discs, for example.

First Embodiment

A thin-type magazine which stores a large number of optical discs, and a high-speed accessible compact disc changer with high capacity for recording/reproducing data of the optical disc taken from the magazine will be described referring to FIGS. 1 to 8, 19, and 20.

Figure 1:
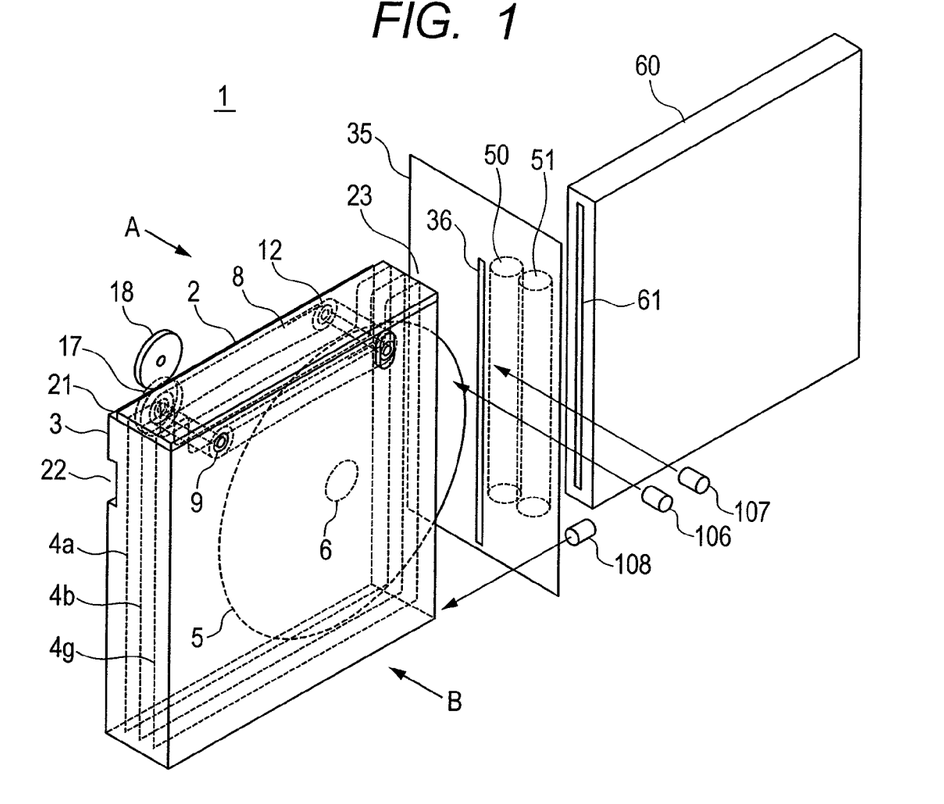
FIG. 1 is a view illustrating a general structure of a disc changer 1 according to an exemplary embodiment of the present invention.
Figure 2:
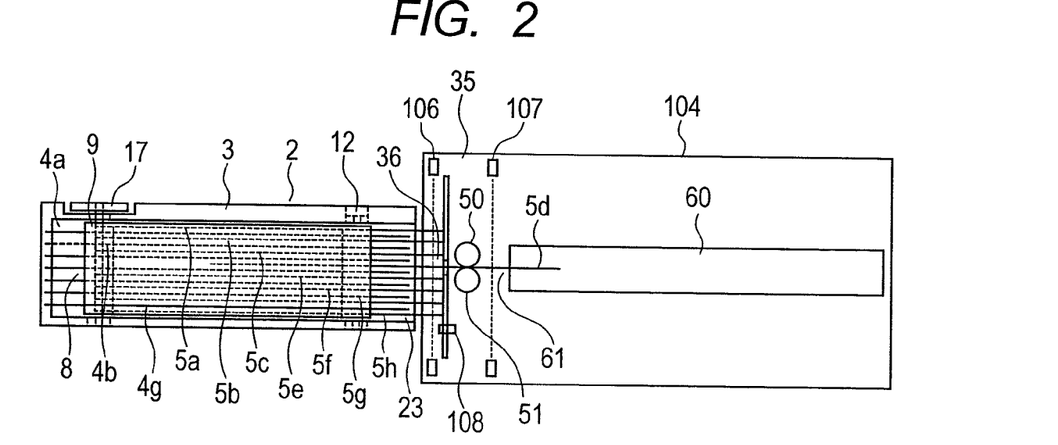
FIG. 2 is a plan view of the disc changer 1 shown in FIG. 1 when seen from above.

FIG. 1 is a perspective view illustrating a general structure of a disc changer 1. FIG. 1 illustrates only one of a plurality of stored optical discs 5. FIG. 2 is a plan view of the structure shown in FIG. 1 when seen from above.

Figure 3:
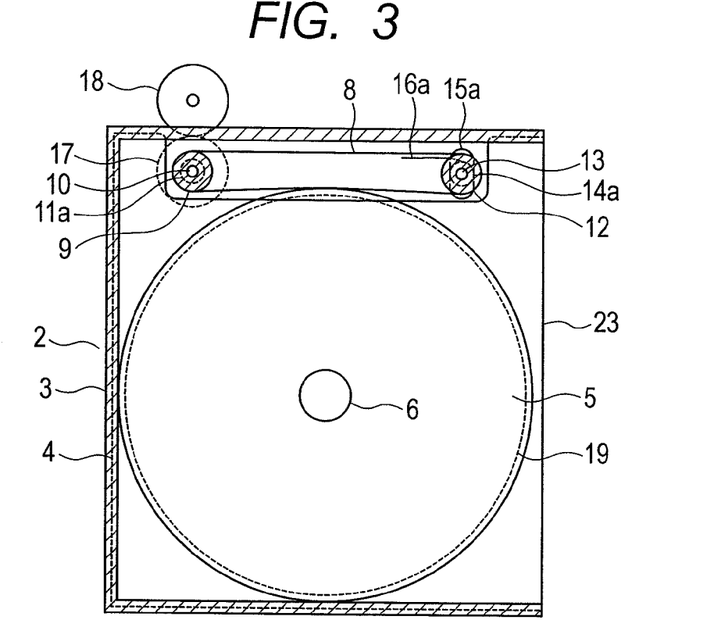
FIG. 3 is a sectional view of a magazine 2 shown in FIG. 1.
Figure 4:
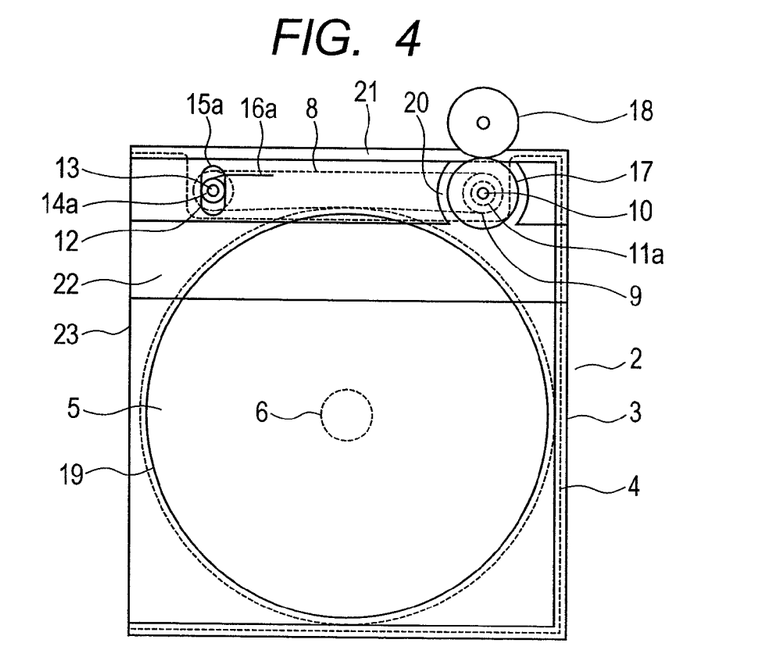
FIG. 4 is a side view of the magazine 2 shown in FIG. 1 when seen from arrow A.
Figure 5:
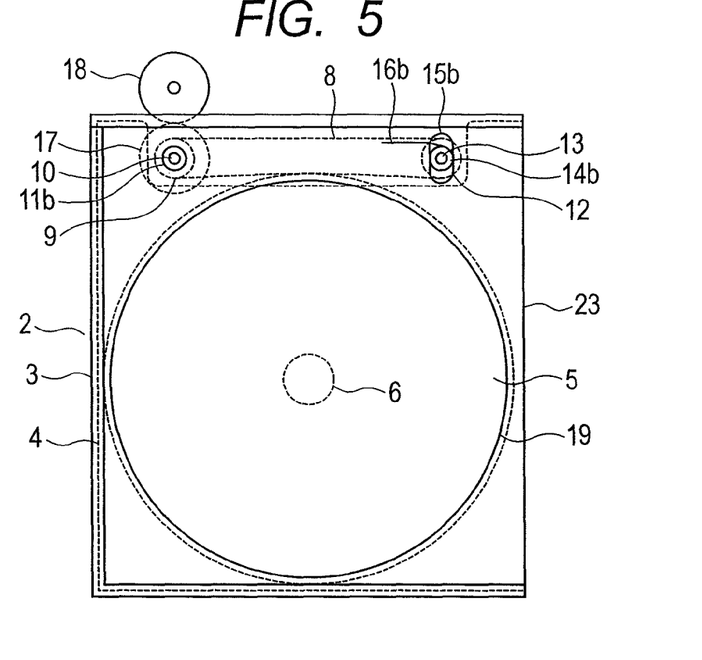
FIG. 5 is a side view of the magazine 2 shown in FIG. 1 when seen from arrow B.
Figure 6:
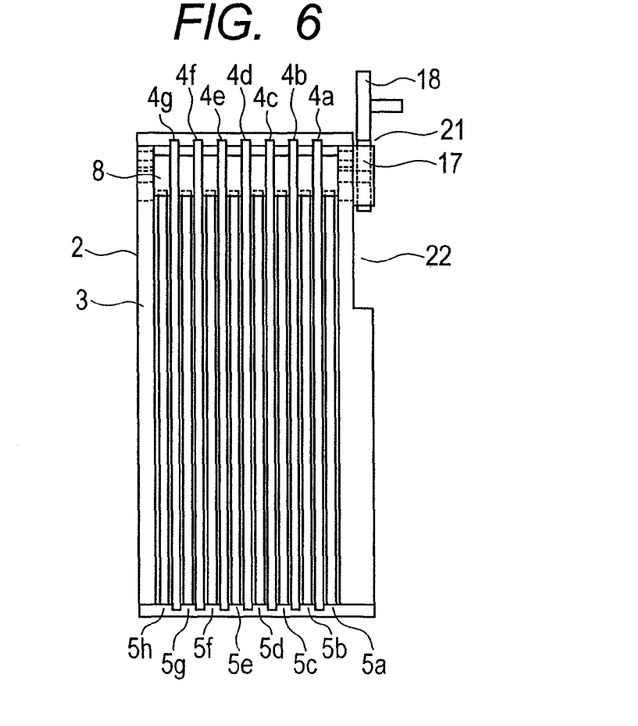
FIG. 6 is a front view of the magazine 2 shown in FIG. 1 when seen from its insertion portion 23 through which an optical disc 5 is inserted.

FIG. 3 is a sectional view of the magazine 2 shown in FIG. 1 when seen from arrow B. FIG. 4 is a side view of the magazine 2 shown in FIG. 1 when seen from arrow A. FIG. 5 is a side view of the magazine 2 shown in FIG. 1 when seen from arrow B FIG. 6 is a front view of the magazine 2 shown in FIG. 1 when seen from an insertion portion 23 through which the disc is inserted.

Figure 7:
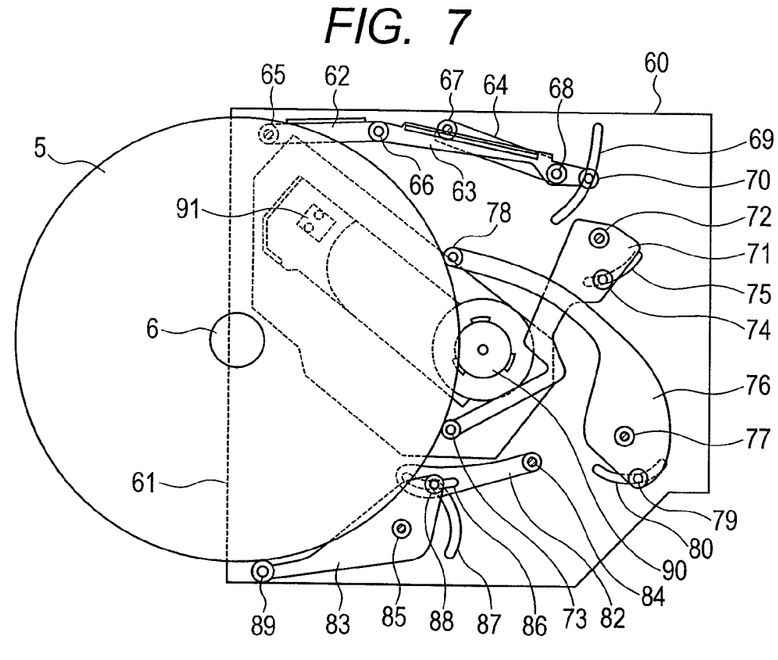
FIG. 7 is a view which represents a state where the optical disc 5 is inserted into or ejected from a drive 60 shown in FIG. 1.
Figure 8:
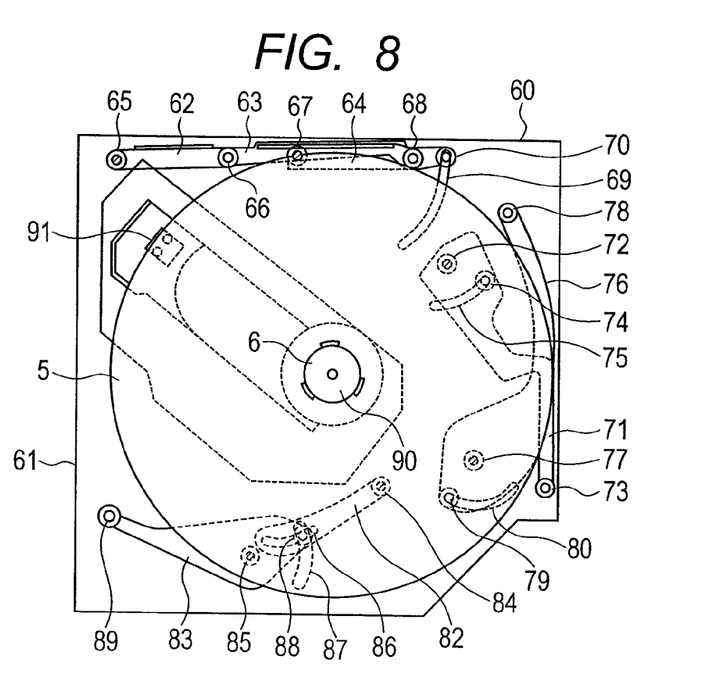
FIG. 8 is a view which represents a state where the optical disc 5 in the drive 60 shown in FIG. 1 is subjected to recording/reproducing.

FIG. 7 represents a state where the optical disc 5 is inserted into or ejected from a drive 60 for recording/reproducing the optical disc 5. FIG. 8 represents a state where the optical disc 5 is recorded/reproduced in the drive 60.

Figure 19:
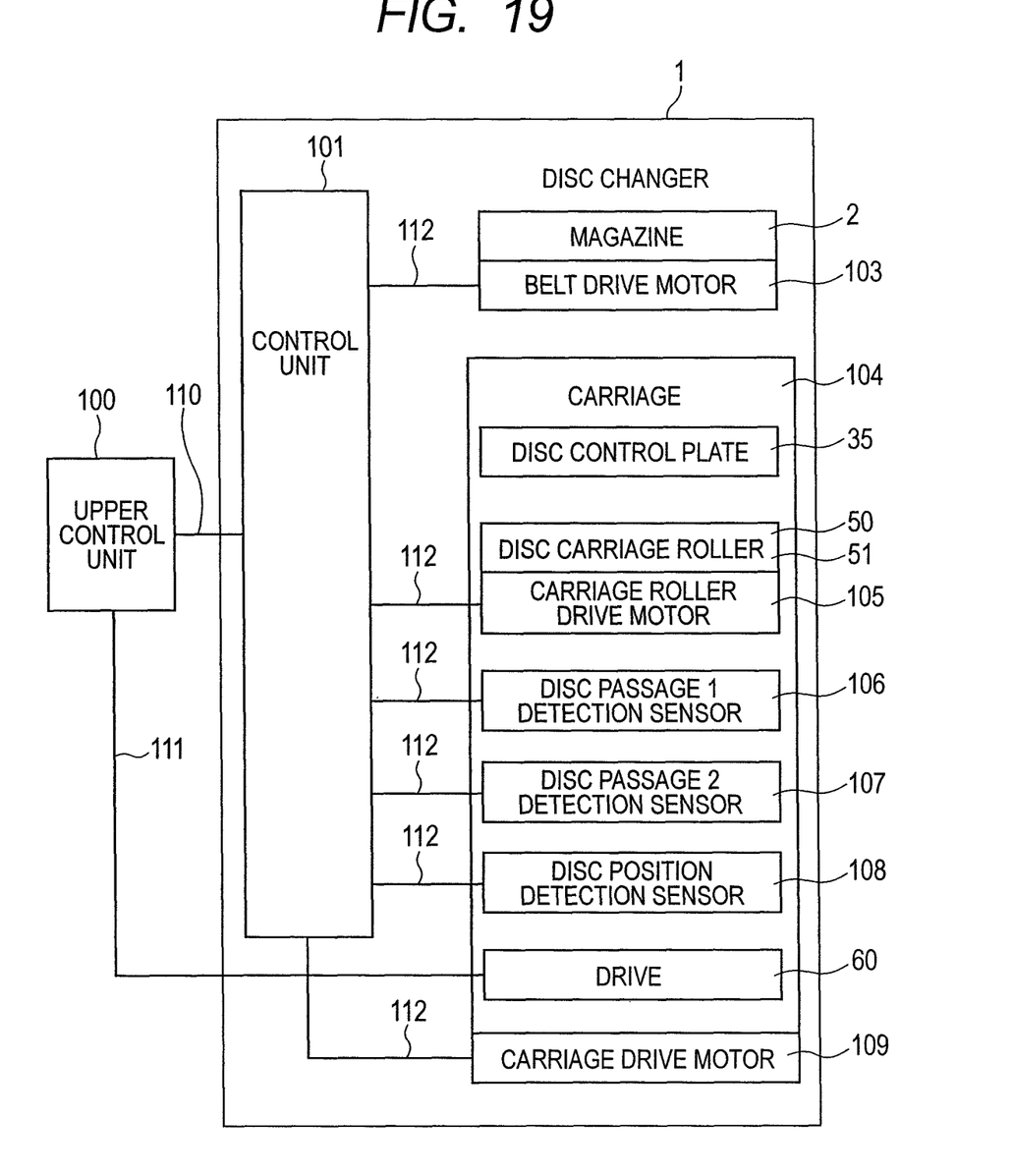
FIG. 19 is a control block diagram of the disc changer shown in FIG. 1.
Figure 20:
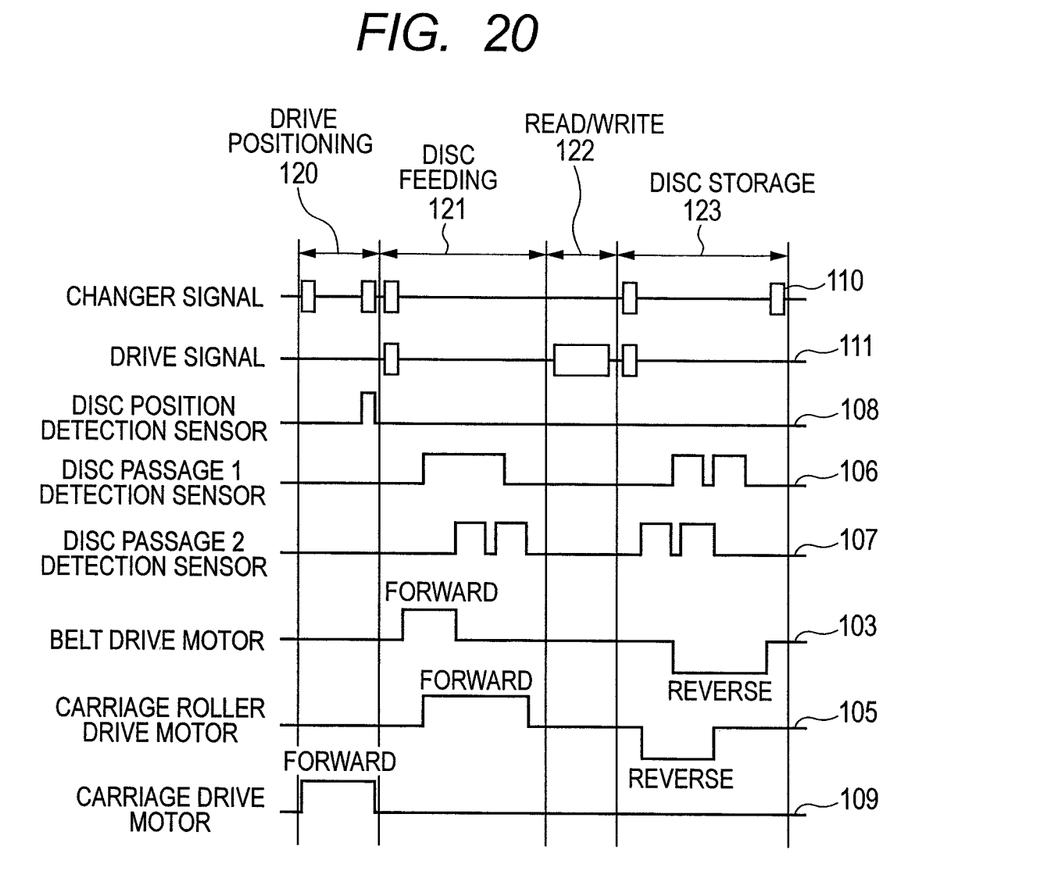
FIG. 20 is a timing chart representing respective operations of the disc changer shown in FIG. 1.

FIG. 19 is a control block diagram of the disc changer shown in FIG. 1, which illustrates an upper control unit 100, a control unit 101 of the disc changer 1, and respective mechanisms including the magazine 2, a disc control plate 35, a drive roller 50, a driven roller 51, the drive 60, a carriage 104, drive motors 103, 105, 109 and respective detection sensors 106, 107, 108, and a changer signal line 110 for a control signal between the upper control unit 100 and the control unit 101, a drive signal line 111 for a control signal and a data signal between the upper control unit 100 and the drive 60, and signal lines 112 between the control unit 101 and each of the respective motors and sensors. FIG. 20 is a timing chart representing operations of the disc changer shown in FIG. 1.

Structure and operation of the disc changer 1 will be described referring to FIGS. 1, 2, 19 and 20. The disc changer 1 includes the magazine 2 which stores a large number of optical discs 5, the drive 60 which records/reproduces the optical disc 5 taken from the magazine 2, the disc control plate 35 that is disposed between the magazine 2 and the drive 60, and controls operations for passing and stopping the optical disc 5, the drive roller 50 and the driven roller 51 of the disc carriage roller for carrying the optical disc 5 passing through a slit 36 of the disc control plate 35 to the drive 60, or carrying the optical disc 5 from the drive 60 to the magazine 2. The drawings also show a clamp hole 6 for fixing the optical disc 5 to a rotary portion. Referring to FIG. 3, an outer circumference of the optical disc 5 is a non-recordable area 19 which does not record data. A disc passage 1 detection sensor 106 is disposed between the magazine 2 and the disc control plate 35. A disc passage 2 detection sensor 107 is disposed between the drive roller 50 and the driven roller 51 of the disc carriage roller, and the drive 60. A disc position detection sensor 108 detects a position of the optical disc 5 stored in the magazine 2.

The magazine 2 is structured to be detachably installed in the disc changer 1. The magazine 2 has a large number of chambers divided by partitions 4a to 4g for storing the optical discs 5a to 5h, respectively. Three sides of each of the partitions 4a to 4g except the side at the insertion portion 23 are fixed to a casing 3.

FIG. 3 omits a portion of a belt 8 of the partitions 4a to 4g. The belt 8 is set around rollers 9 and 12, and urged toward the optical disc 5 so as to be brought into contact with each outer circumferential side surface of the optical discs 5a to 5g. A rotary shaft 10 (FIGS. 4 and 5) of the roller 9 is supported at a bearing 11a (11a shown in FIG. 4, 11b shown in FIG. 5) attached to the casing 3. A rotary shaft 13 (FIGS. 4 and 5) of the roller 12 is supported at a bearing 14a (14a shown in FIG. 4, 14b shown in FIG. 5) movably attached to the casing 3 in direction of the optical disc 5. The bearing of the roller 12 is urged toward the optical disc 5 by a plate spring 16a (16a shown in FIG. 4, 16b shown in FIG. 5). The rotary shaft 10 of the roller 9 is provided with a gear 17. When the magazine 2 is inserted into the disc changer 1, the gear 17 is guided by a guide groove 21 or 22 formed in the casing 3 to be engaged with a gear 18 provided in the disc changer 1.

Referring to FIG. 2, when the optical disc 5d is taken from the magazine 2 so that the drive 60 performs read/write or recording/reproducing operation 122, a drive positioning operation 120 is performed. That is, the carriage 104 provided with the disc control plate 35, the drive roller 50 and the driven roller 51 of the disc carriage roller, the drive 60, and the respective detection sensors 106, 107, 108 is moved by a carriage drive motor 109 and the disc position detection sensor 108 so as to align the slit 36 with a position opposite the target optical disc 5d in the magazine 2. The positioning operation will be referred to as a drive side movement. The slit 36 of the disc control plate 35, a disc passage position of the drive roller 50 and the driven roller 51 of the disc carriage roller, and an inlet 61 of the drive 60 are aligned on the same line. The magazine 2 and the carriage (not shown) provided with the gear 18 may be moved for positioning so that the target optical disc 5d faces the slit 36. The positioning operation will be hereinafter referred to as a magazine side movement. A plurality of combinations of the magazine 2 and the gear 18 may be arranged in parallel with one another. The structure increases the memory capacity and allows sequential switching of the magazine, resulting in seamless recording/reproduction.

A disc feeding operation 121 is performed by rotating the gear 18 using the belt drive motor 103, and transferring the rotating force to the gear 17 so as to operate the belt 8. Upon reception of the rotating force from the belt 8, the optical discs 5a to 5g rotate and move toward the insertion portion 23. When the optical discs 5a to 5g output from the magazine 2 reach the disc control plate 35, the optical disc 5d passes through the slit 36, and the other optical discs stop while abutting against the disc control plate 35. The optical disc 5d which has passed through the slit 36 is inserted between the drive roller 50 and the driven roller 51 of the disc carriage roller, and carried from the inlet 61 of the drive 60 and inserted therein for recording/reproducing. When the disc passage 2 detection sensor 107 as light transmission type passage sensor disposed around the drive roller 50 and the driven roller 51 of the disc carriage roller detects passage of the optical disc 5d, the operation of the belt 8 is stopped. This makes it possible to suppress damage to the optical disc caused by the partition 4 in contact with racing optical disc 5, and generation of abrasion powder owing to the casing 3 or the belt 8. Referring to FIG. 20, the carriage roller drive motor 105 is driven to rotate the drive roller 50 and the driver roller 51 of the disc carriage roller when the optical disc 5 starts passing through the disc passage 1 detection sensor 106. The rotation of those rollers is controlled to be stopped when the optical disc 5 finishes passing through the disc passage 2 detection sensor 107. This may ensure to suppress abrasion between the optical disc 5, and the drive roller 50 and the driven roller 51 of the disc carriage roller.

The belt 8 may have a concavo-convex surface in contact with the optical disc 5 for reducing slippage between the belt 8 and the optical disc 5. The belt 8 and the rollers 9, 12 may be formed into the toothed belt 8 and the toothed rollers 9, 12, respectively for reducing slippage therebetween. As the optical disc 5, commercially available disc with average thickness of 1.2 mm (maximum thickness: approximately 1.5 mm) and outside diameter of 120 mm may be employed. In the case where the commercial optical disc is employed, the disc storage pitch of the magazine 2 becomes approximately 2 mm to 3 mm. Preferably, the slit 36 has a width set to be smaller than the value twice larger than the thickness Dw of the optical disc stored in the magazine 2. Each width of the disc control plate 35 at both sides of the slit 36, against of which the discs abut to stop moving is set to be equal to or larger than the value "(number of stored discs−1)×disc storage interval". The drive roller 50 of the disc carriage roller is brought into contact with the non-recordable surface of the optical disc 5, and the driven roller 51 is disposed to be in contact with the recordable surface. The aforementioned arrangement prevents slippage between the driven roller 51 of the disc carriage roller and the recordable surface of the optical disc 5, thus protecting the recordable surface from damage.

A disc storage operation 123 for returning the optical disc 5d from the drive 60 to the magazine 2 is performed by passing the optical disc 5d output from the drive 60 to be inserted between the drive roller 50 and the driven roller 51 of the disc carriage roller. The optical disc is further carried to pass through the slit 36, and inserted into the magazine 2. The outer circumferential surface of the optical disc 5d inserted into the magazine 2 is in contact with the belt 8, to which the rotating force is applied. The optical disc is rotated and moved to be stored in the magazine 2. Simultaneously, the other optical discs are rotated and moved by the belt 8 to be stored in the magazine 2. The belt 8 is stopped upon detection of passage of all the optical discs 5 by the light transmission type disc passage 1 detection sensor 106 disposed around the insertion portion 23 of the magazine 2, or upon elapse of a predetermined time from detection of passage of all the optical discs 5. This makes it possible to prevent damage of the disc caused by contact of the partition 4 with the racing optical disc 5, and suppress generation of abrasion powder from the casing 3 and the belt 8. Likewise, as FIG. 20 shows, the drive roller 50 and the driven roller 51 of the disc carriage roller are controlled to be rotated by the carriage roller drive motor 105 upon detection of passage of the optical disc 5 through the disc passage 2 detection sensor 107, and are controlled to be stopped upon completion of passage through the disc passage 2 detection sensor 107. This makes it possible to reduce abrasion between the optical disc 5, and the drive roller 50 and the driven roller 51 of the disc carriage roller.

According to an exemplary embodiment of the present invention, the belt in contact with each outer circumferential surface of all the optical discs stored in the magazine is set therein, and operated to take out or store the optical discs which are moved. This makes it possible to reduce the storage interval of the optical disc, thus providing a compact magazine with high capacity. As the optical disc is carried while being urged against the belt 8, it may be prevented from jumping out of the casing, and kept immobilized so as not to be damaged. The optical discs are stored while being separated with the respective partitions. This makes it possible to prevent leaning of the optical disc, thus preventing contact between the adjacent discs. The partition serves as the guide for inserting the optical disc into the optical disc storage magazine, resulting in easy insertion.

The magazine is structured to be detachably installed in the main body of the disc changer. The disc changer is structured to allow the target optical disc of those taken from the magazine through rotating movement to pass through the slit of the disc control plate, and the other optical discs to stop while abutting against the disc control plate for recording/reproducing the target optical disc. This makes it possible to provide the high-speed accessible compact disc changer with high capacity.

FIG. 3 is a sectional view of the magazine 2 shown in FIG. 1 when seen from arrow B. Explanations of codes in FIG. 3 which are the same as those shown in FIGS. 1 and 2 will be omitted. The drawing shows the state where the optical disc 5 is stored in the magazine 2. Three sides of the partition except the one at the side of the insertion portion 23 through which the optical disc 5 is inserted are fixed to the casing 3. The portion of the partition 4 corresponding to the belt 8 is deleted. The belt 8 is set around the rollers 9 and 12, and is urged toward the optical disc 5 so as to be in contact with the outer circumferential surface of the optical disc 5. The outer circumference of the optical disc 5 serves as a non-recordable area 19.

FIG. 4 is a side view of the magazine 2 shown in FIG. 1 when seen from arrow A. Explanations of codes in FIG. 4 which are the same as those shown in FIGS. 1 to 3 will be omitted. The rotary shaft 10 of the roller 9 is supported at the bearing 11a attached to the casing 3. The rotary shaft 13 of the roller 12 is supported at the bearing 14a which is movably attached to a long hole 15a formed in the casing 3 in direction of the optical disc 5. The bearing 14a of the roller 12 is urged toward the optical disc 5 by the plate spring 16a attached to the casing 3. The rotary shaft of the roller 9 is provided with the gear 17, and is engaged with the gear 18 provided in the disc changer 1 while being guided by the guide groove 21 formed in the casing 3 or the guide groove 22 (if the gear 18 is located in the guide groove 22) when the magazine 2 is inserted into the disc changer 1. A concave portion 20 serves to store the gear 17 provided in the casing 3. As described above, the gear 17 is stored in the casing 3 so as not to protrude therefrom. The magazine may be formed to have a compact structure with no gap with the adjacent element without requiring the large storage space.

FIG. 5 is a side view of the magazine 2 shown in FIG. 1 when seen from arrow B. Explanations of codes in FIG. 5 which are the same as those shown in FIGS. 1 to 4 will be omitted. The rotary shaft 10 of the roller 9 is supported at the bearing 11b attached to the casing 3. The rotary shaft 13 of the roller 12 is supported at the bearing 14b which is movably attached to a long hole 15b formed in the casing 3 in direction of the optical disc 5. The bearing 14b of the roller 12 is urged toward the optical disc 5 by the plate spring 16b attached to the casing 3. The use of the plate spring 16 contributes to downsizing of the magazine.

Figure 18:
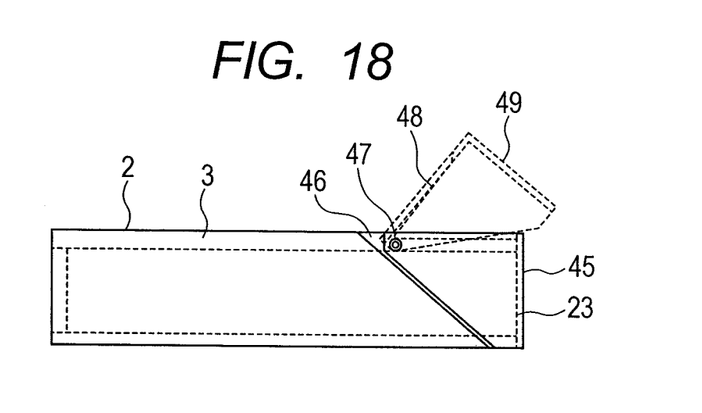
FIG. 18 illustrates a cover of the magazine 2 according to the exemplary embodiment of the present invention.

FIG. 6 is a front view of the magazine 2 shown in FIG. 1 when seen from the insertion portion 23 through which the disc is inserted. Explanations of codes in FIG. 6 which are the same as those shown in FIGS. 1 to 5 will be omitted. The magazine 2 has a large number of chambers separated by the partitions 4a to 4g for storing the corresponding optical discs 5a to 5h, respectively. The belt 8 is urged toward the optical disc 5 so as to be in contact with the outer circumferential surface of the optical disc 5. A cover 45 (FIG. 18) for closing the insertion portion 23 may be provided so as to prevent intrusion of dust from the insertion portion 23. FIG. 18 shows the magazine 2 provided with the cover 45 which is attached to a rotary shaft 47 of a stepped portion 46 of the casing 3. The cover 45 is provided so as not to extend outside the casing 3, and is urged in direction where the cover 45 is closed by a helical spring 48. The position at which the cover 45 is opened is designated with a code 49.

Structure and operation of the drive 60 will be described referring to FIGS. 7 and 8. FIG. 7 illustrates a state where the optical disc 5 is inserted into or ejected from the drive 60. FIG. 8 illustrates a state where the optical disc 5 is recorded/reproduced in the drive 60.

The drive 60 is provided with a parallel link formed of links 62, 63, 64 and a guide mechanism formed of links 71, 76, 82, 83 for installing the optical disc 5 inserted from the inlet 61 to a spindle motor 90, and an optical mechanism 91 for performing recording/reproducing. Black circles 65, 67, 72, 77, 84 and 85 of the link mechanisms shown in the drawing denote rotary shafts fixed to the casing. White circles 66 and 68 denote connecting shafts.

Referring to FIG. 7, the optical disc 5 inserted from the inlet 61 is moved while being guided by a side wall of the link 62 as the parallel link and a groove roller 89 of the link 83, and having the clamp hole 6 guided toward the spindle motor 90. The link 83 moves a drive shaft 88 along a link groove 87 so that the optical disc 5 is moved toward the spindle motor 90. The link 71 moves a drive shaft 74 along a link groove 75 so that a groove roller 73 is retracted. Likewise, the link 76 moves a drive shaft 79 along the link groove 80 to retract a groove roller 78. The operation allows the clamp hole 6 to be positioned with respect to the spindle motor 90. The spindle motor 90 then moves toward the optical disc 5 so that the clamp hole 6 is set in the rotary portion and fixed.

Referring to FIG. 8, the link 64 of the parallel link moves a drive shaft 70 along a link groove 69 so that side walls of the links 62, 63 are retracted to the positions that are not in contact with the optical disc 5. The links 71, 76 and 83 also move to retract the rollers 73, 78 and 89 to positions that are not in contact with the optical disc 5 for recording/reproducing. Reverse procedure to the one for inserting the optical disc 5 as described referring to FIG. 7 is performed to eject the optical disc 5 from the drive 60. This makes it possible to provide the thin compact drive.

Second Embodiment

Figure 9:
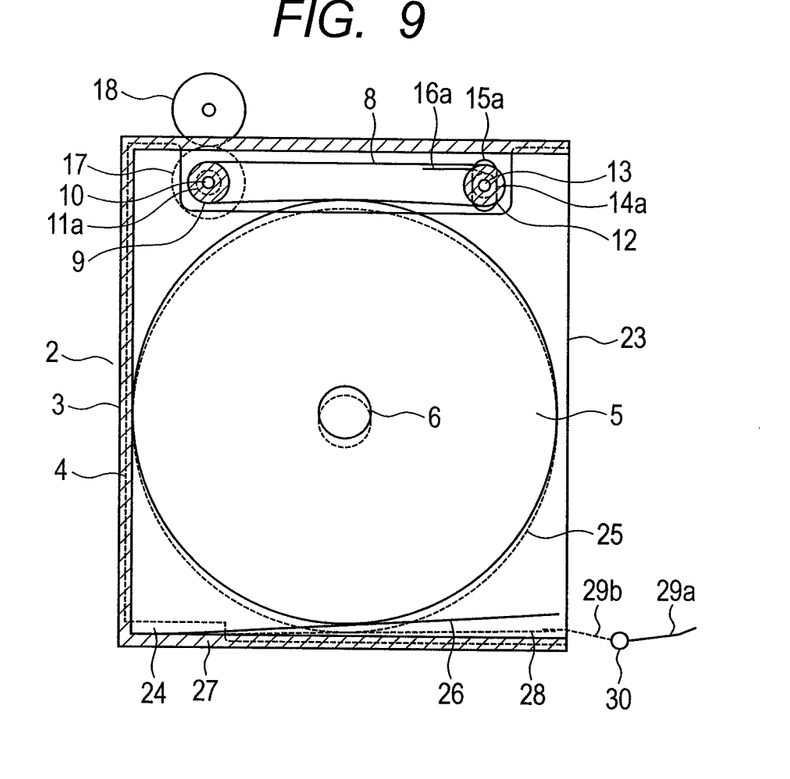
FIG. 9 illustrates a magazine 2 according to another exemplary embodiment of the present invention.
Figure 10:
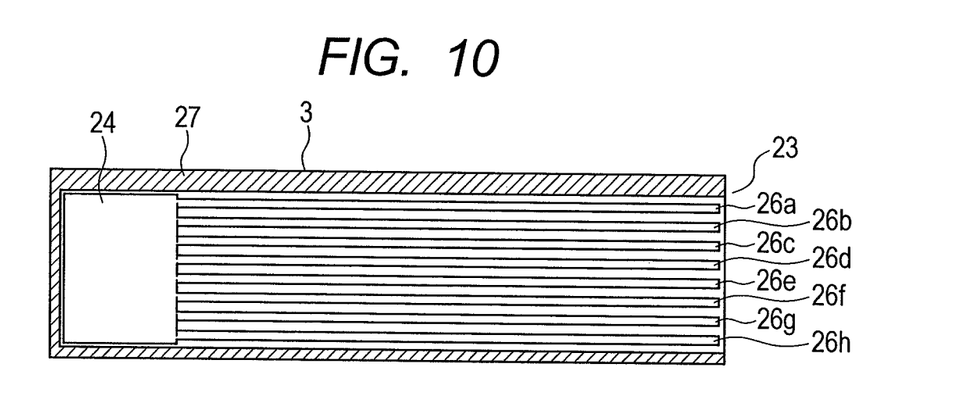
FIG. 10 is a plan view of a plate spring 26 shown in FIG. 9.

Another exemplary embodiment of the magazine 2 according to the present invention will be described referring to FIGS. 9 and 10. FIG. 9 illustrates a structure of the magazine 2 shown in FIG. 3, to which a plate spring 26 is added for moving the optical disc 5 toward the belt 8. Explanations of codes in FIG. 9 which are the same as those shown in FIG. 3 will be omitted. FIG. 10 is a plan view of the plate spring 26 shown in FIG. 9. Each of plate springs 26a to 26h is formed by processing a spring plate 24 into a strip-like form corresponding to each storage interval for the optical discs 5a to 5h shown in. FIG. 6, and is further bent at a bending portion 27. Gaps between adjacent plate springs 26a to 26h accommodate corresponding partitions 4a to 4g, respectively.

Referring to FIG. 9, the plate spring 26 has the spring plate 24 fixed to the casing 3. When the magazine 2 is inserted into the disc changer 1, a large number of spring holding plates 30 corresponding to the plate springs 26a to 26h rotate from a position 29a to 29b as shown by a broken line so as to press down the plate springs 26a to 26h to the position 28 indicated by the broken line. In order to rotate and move the optical disc 5, the spring holding plate 30 corresponding to the target optical disc 5 is rotated to the position 29a so that the plate spring 26 moves toward the belt 8 which is then brought into contact with the optical disc 5. The optical disc 5 taken from the magazine 2 may be selected with either of the plate springs 26a to 26h. The disc control plate 35 may be eliminated by applying the aforementioned mechanism to the disc changer 1 shown in FIG. 1. The disc changer 1 is provided with the spring holding plates 30 for driving the plate springs 26a to 26h.

In this way, the optical disc 5 to be taken from the magazine 2 may be selected. This may omit the disc control plate 35 from the disc changer 1, thus reducing size and cost. The target optical disc is only rotated and moved, and the other optical discs are kept immobilized, thus preventing damage to the disc caused by the contact with the partition 4, and suppressing generation of abrasion powder against the casing 3 and the belt 8. The stored optical disc is urged toward the belt 8 by the plate spring 26. This makes it possible to constantly keep the contact between the optical disc and the belt 8 in stable state even if the diameter of the optical disc changes. The optical disc is urged against the belt 8 during casing operation, which prevents the optical disc from jumping out of the casing, and being damaged in the immobilize state.

Third Embodiment

Figure 11:
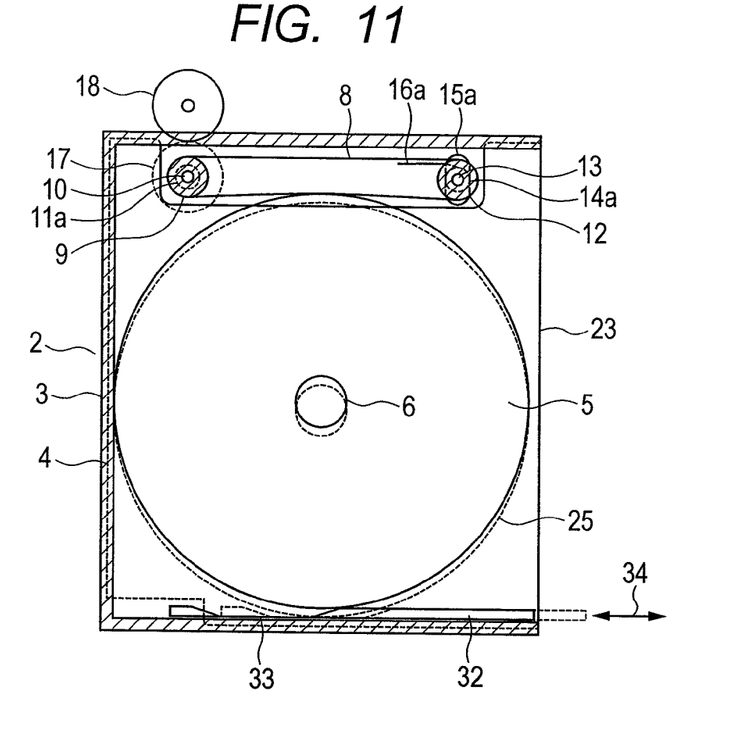
FIG. 11 illustrates a magazine 2 according to another exemplary embodiment of the present invention.

Another exemplary embodiment of the magazine 2 according to the present invention will be described referring to FIG. 11. In FIG. 11, the plate spring 26 shown in FIG. 9 has been replaced by a slide plate 32. Explanations of codes in FIG. 11 which are the same as those shown in FIG. 9 will be omitted.

The slide plate 32 has a concave portion 33 with its size sufficient to accommodate the optical disc 5, and moves in direction of arrow 34 (the drive mechanism is not shown). In order to urge the optical disc 5 against the belt 8, the slide plate 32 is moved inward of the magazine 2 as indicated by a solid line so that the optical disc 5 is placed on the slide plate 32. In order to separate the optical disc 5 from the belt 8, the slide plate 32 is moved outward of the magazine 2 as indicated by a broken line so that the optical disc 5 is accommodated by the concave portion 33 of the slide plate 32.

The optical disc 5 to be taken from the magazine 2 may be selected by the slide plate 32. The disc control plate 35 may be omitted by applying the aforementioned mechanism to the disc changer 1 as shown in FIG. 1. The disc changer 1 is provided with the mechanism for driving the slide plate 32.

In this way, the optical disc 5 to be taken from the magazine 2 may be selected. This may omit the disc control plate 35 from the disc changer 1, thus reducing size and cost. The target optical disc is only rotated and moved, and the other optical discs are kept immobilized, thus preventing damage to the disc caused by the contact with the partition 4, and suppressing generation of abrasion powder from the casing 3 and the belt 8. The stored optical disc is urged toward the belt 8 by the slide plate 32. This makes it possible to constantly keep the contact between the optical disc and the belt 8 in stable state even if the diameter of the optical disc changes. The optical disc is urged against the belt 8 during casing operation, which prevents the optical disc from jumping out of the casing, and being damaged in the immobilize state.

Fourth Embodiment

Figure 12:
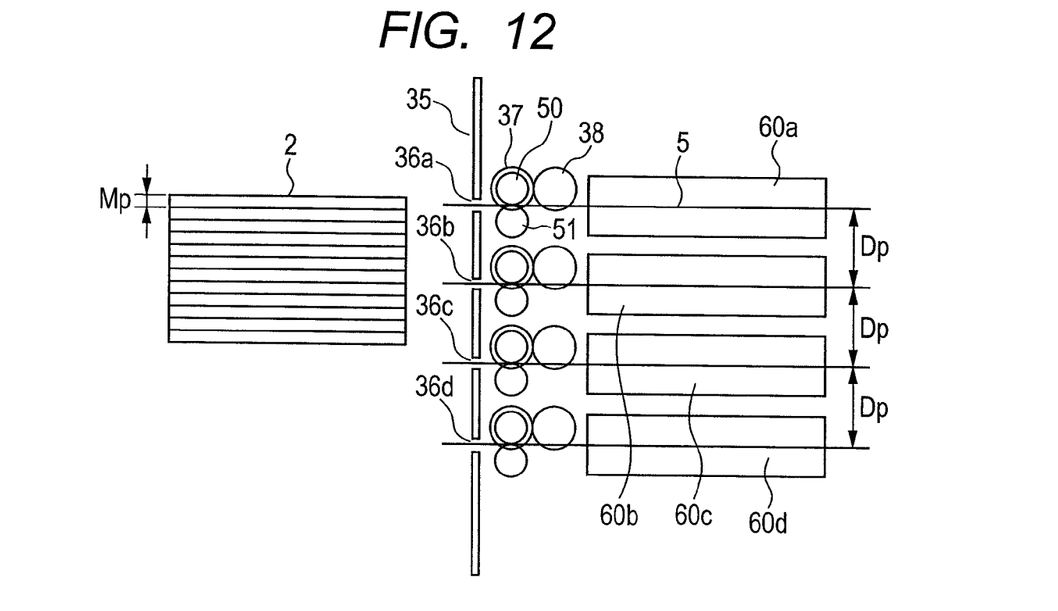
FIG. 12 illustrates a disc changer 1 according to another exemplary embodiment of the present invention.

Another exemplary embodiment of the disc changer 1 according to the present invention will be described referring to FIG. 12. In FIG. 12, a plurality of drives 60a to 60d is added to the structure shown in FIG. 1. The drives 60a to 60d are provided with slits 36a to 36d, disc carriage rollers including the drive rollers 50 and the driven rollers 51, respectively, gears 37 each for rotating the drive roller 50 as the disc carriage roller, and drive mechanisms 38 each connected to the corresponding gear 37. Explanations of the codes shown in FIG. 12 which are the same as those shown in FIG. 1 will be omitted.

A storage interval between the optical discs 5 in the magazine 2 is designated with Mp. Each interval between adjacent drives among those from 60a to 60d is designated with Dp. The slits 36a to 36d of the disc control plate 35, the disc passage positions of the drive roller 50 and the driven roller 51 of the disc carriage roller, and the drives 60a to 60d are positioned on the same line. Each of the drive rollers 50 as the disc carriage roller is provided with the gear 37, and the drive mechanism 38 linked therewith is rotated so as to rotate the drive roller 50. The disc control plate 35, the drive roller 50 and the driven roller 51 of the disc carriage roller, the gear 37 and the drive mechanism 38 for rotating the drive roller 50, and the carriage (not shown) provided with the drives 60a to 60d are moved to locate the slits 36a to 36d to the position opposite the target optical disc 5 in the magazine 2. The magazine 2 may be replaced with the one provided with the disc moving mechanism formed of the spring plate 26 shown in FIG. 9 or the slide plate 32 shown in FIG. 11. In the aforementioned case, the disc control plate 35 may be omitted. The magazine 2 and the carriage (not shown) provided with the gear 18 may be moved to locate the target optical disc 5 and the slits 36a to 36d are positioned to face with each other. A plurality of combinations of the magazine 2 and the gear 18 may be arranged in parallel. This makes it possible to increase the memory capacity and to sequentially switch the magazine, resulting in seamless recording/reproducing.

First structure: Each interval Dp of the respective drives 60a to 60d is minimized to the smallest possible value. The drive roller 50 and the driven roller 51 of the disc carriage roller through which the target optical disc 5 passes are only rotated while stopping rotations of the drive rollers 50 and the driven rollers 51 of the other disc carriage rollers. In this way, the target optical disc 5 passes through the slit, and carried to the drive 60 so as to be recorded/reproduced through rotating the drive roller 50 and the driven roller 51 of the disc carriage roller. The optical discs except the target optical disc 5 stop while abutting against the disc control plate 35. The optical disc 5 passing through the slit 36 stops while abutting against the drive roller 50 and the driven roller 51 of the disc carriage roller which have been stopped.

Second structure: One slit 36 is formed in the disc control plate 35 in the first structure so that the disc control plate 35 is independently moved. Each of the carriages is moved so that the target optical disc 5 and the drive roller 50 and the driven roller 51 of the disc carriage roller are positioned to face with each other. The slit 36 is moved to the position opposite the drive roller 50 are positioned to face with each other. In this way, the target optical disc 5 passes through the slit 36, and carried to the drive 60 through the drive roller 50 and the driven roller 51 of the disc carriage roller for recording/reproducing operations. The optical discs 5 except the target one stop while abutting against the disc control plate 35. Any one of the optical discs stored in the magazine 2 may be supplied to any of the drives 60a to 60d for recording/reproducing.

Third structure: Each interval Dp of the drives 60a to 60d is set to the value integral multiple of the storage interval Mp of the optical disc 5 so that a plurality of optical discs are allowed to pass through the slits 36 simultaneously, and inserted into the corresponding drives 60a to 60d for recording/reproducing. This allows the belt to be set around the drive rollers 50 as a plurality of disc carriage rollers so as to be operated simultaneously. The time for exchanging the disc between the magazine 2 and each of the drives 60a to 60d may be reduced.

Fifth Embodiment

Figure 13:
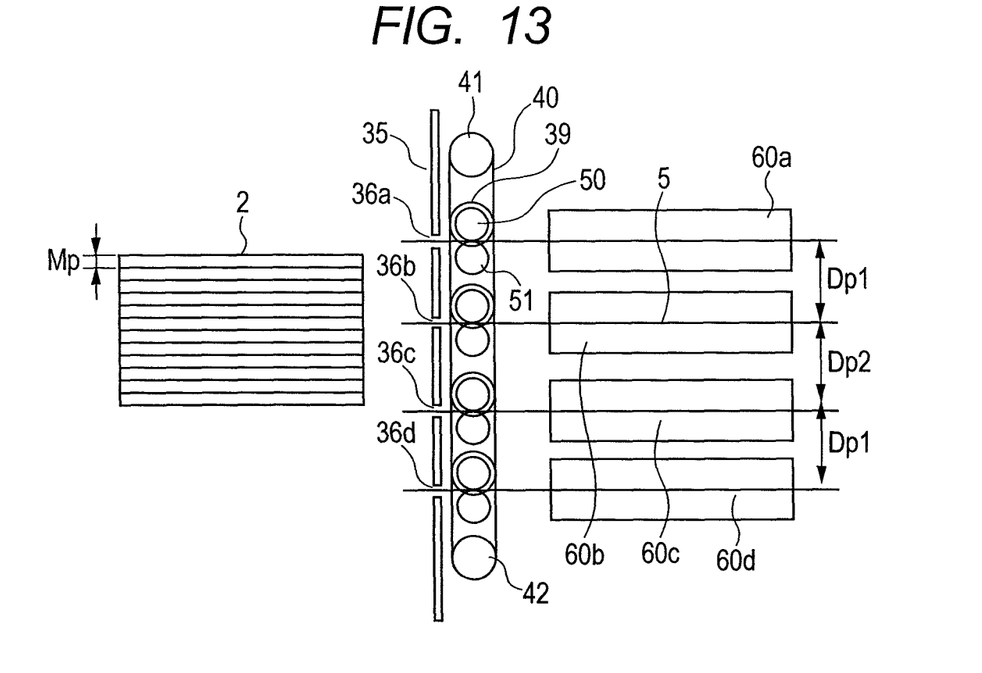
FIG. 13 illustrates a disc changer 1 according to another exemplary embodiment of the present invention.

Another exemplary embodiment of the disc changer 1 according to the present invention will be described referring to FIG. 13. FIG. 13 illustrates a structure formed by adding a pulley 39 for rotating the drive roller 50 as the disc carriage roller to the structure shown in FIG. 12, which has a belt 40 set around the pulleys 39, 40 and 42. Explanations of the codes in FIG. 13 which are the same as those shown in FIG. 12 will be omitted.

The storage interval between adjacent optical discs in the magazine 2 is designated as Mp. Each interval of the even-numbered-order drives 60b and 60d is designated as Dp1, and the interval between the odd-numbered-order drives 60c is designated as Dp2. The slits 36a to 36d of the disc control plate 35, the disc passage positions of the drive roller 50 and the driven roller 51 of the disc carriage roller, and the drives 60a to 60d are aligned on the lines, respectively. The drive roller 50 of each of the disc carriage rollers is provided with the pulley 39. The belt 40 set around the pulleys 39, 41 and 42 is operated to rotate the drive roller 50 of the disc carriage roller is rotated. The disc control plate 35, the drive roller 50 and the driven roller 51 of the disc carriage roller, the pulleys 39, 41, 42 for rotating the drive roller 50 as the disc carriage roller, and the carriage (not shown) provided with the drives 60a to 60d are moved to locate the slits 36a to 36d at the position opposite the target optical disc 5 in the magazine 2. The magazine 2 may be applied to the one provided with the disc moving mechanism formed of the spring plate 26 shown in FIG. 9 or the slide plate 32 shown in FIG. 11. In the aforementioned case, the disk control plate 35 may be omitted. The magazine 2 and the carriage (not shown) provided with the gear 18 may be moved so that the target optical disc 5 and the slits 36a to 36d are positioned to face with each other. A plurality of combinations of the magazine 2 and the gear 18 may be arranged in parallel. This allows the belt to be set around the drive rollers 50 of a plurality of disc carriage rollers for simultaneous operations. The time for exchanging the disc between the magazine 2 and each of the drives 60a to 60d may be reduced.

First structure: Assuming that the number of stored discs in the magazine 2 is k, and the relationship of n≠k/2 is established, each interval of the drives 60b and 60d is set by the following equation, that is, Dp1=Dp2=(storage interval Mp of the optical disc 5)×n+Mp/2. Only one of the k optical discs 5 fed from the magazine is allowed to pass through the slit 36, and the other optical discs are stopped while abutting against the disc control plate 35 by establishing the aforementioned equation.

Second structure: Assuming that the number of stored discs in the magazine 2 is k, and the relationship of n=k/2 is established, interval of each of the drives 60b and 60d at even numbered order is set by the following equation, that is, Dp1=(storage interval Mp of the optical disc 5)×n+Mp/2. Interval of the drive 60 at odd numbered order is set by the following equation, that is, Dp2=(storage interval MP of the optical disc 5)×(n+1). Only one of the K optical discs 5 fed from the magazine 2 is allowed to pass through the slit 36, and the other optical discs are stopped while abutting against the disc control plate 35 by establishing the aforementioned equation. This makes it possible to supply any one of the optical discs stored in the magazine 2 to any of the drives 60a to 60d for recording/reproducing operations. Unlike the second structure of the fourth embodiment, the disc control plate 35 may be fixed rather than being moved. Furthermore, the drive system of the drive roller 50 as the disc carriage roller may be simplified, thus reducing size and cost.

Sixth Embodiment

Figure 14:
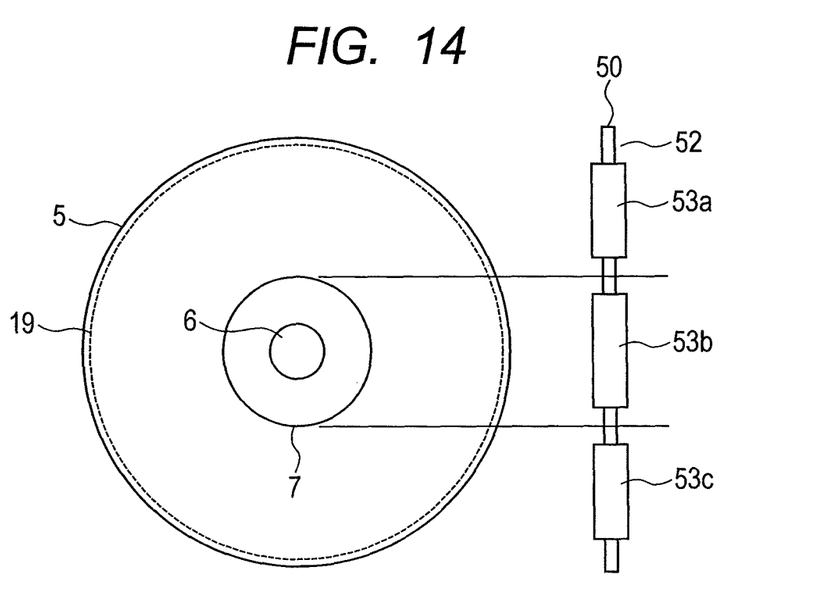
FIG. 14 illustrates a drive roller 50 and a driven roller 51 of a disc carriage roller of the disc changer 1 according to another exemplary embodiment of the present invention.

Another exemplary embodiment of the drive roller 50 and the driven roller 51 of the disc carriage roller of the disc changer 1 according to the present invention will be described referring to FIG. 14. The commercial optical disc 5 has a thin ring-shaped protrusion 7 which protrudes from the surface (recording surface). When the protrusion 7 runs on the drive roller 50 and the driven roller 51 of the disc carriage roller, the roller is only in contact with the protrusion 7, thus providing insufficient carrying force. Then a rubber roller portion provided around a rotary shaft 52 is divided into three sections, that is, rubber rollers 53a and 53c located at outer circumferential side of the protrusion 7 which do not run thereon, and a rubber roller 53b located at an inner circumferential side of the protrusion 7, which has the length shorter than the diameter of the protrusion 7. In this way, even if the protrusion 7 runs on the center rubber roller 53b, the rubber rollers 53a, 53c are in contact with the surface, thus providing sufficient carrying force.

Seventh Embodiment

Figure 15:
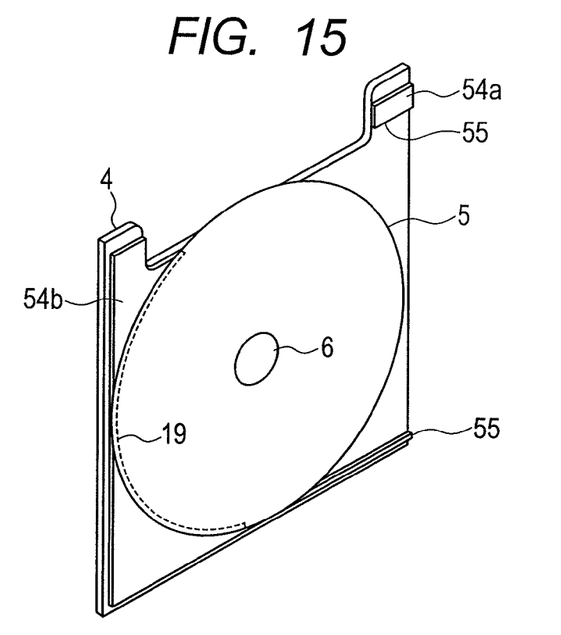
FIG. 15 illustrates a partition 4 of the magazine 2 according to another exemplary embodiment of the present invention.

Another exemplary embodiment of the partition 4 of the magazine 2 according to the present invention will be described referring to FIG. 15. FIG. 15 illustrates protrusions 54a and 54b added to the structure of the partition 4 shown in FIG. 3. Explanations of the codes in FIG. 15 which are the same as those shown in FIG. 3 will be omitted. The partition 4 is provided with the protrusions 54a and 54b at positions only in contact with the non-recordable area 19 of the optical disc 5. An inner circumferential side of the non-recordable area 19 is in contact with a region 55. The protrusion 54a around the insertion portion of the magazine 2 is located at a position only in contact with the non-recordable area 19 of the optical disc 5. The protrusion 54b is located at a position which allows contact only with the non-recordable area 19 of the optical disc 5 from the position where the optical disc 5 is inserted through the insertion portion of the magazine 2 to the position where it is stopped. The protrusions 54a and 54b may be provided on both surfaces of the partition 4. This may prevent contact between the recording area of the optical disc 5 and the partition 4, thus protecting the recording area from being damaged.

Eighth Embodiment

Figure 16:
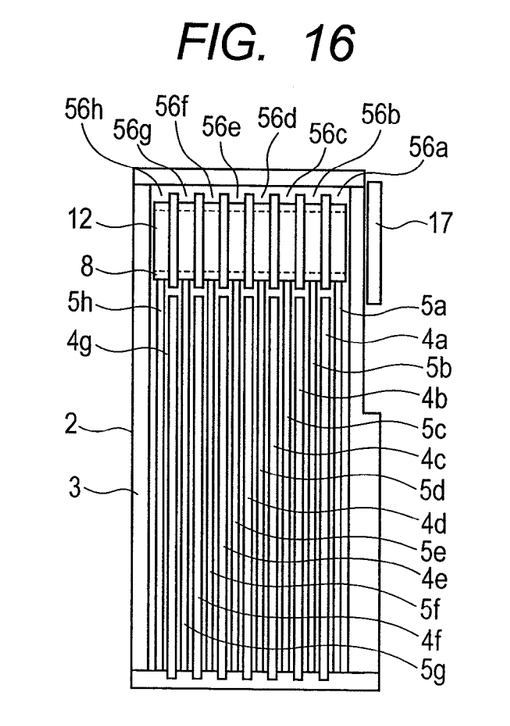
FIG. 16 illustrates a magazine 2 according to another exemplary embodiment of the present invention.

Another exemplary embodiment of the magazine 2 according to the present invention will be described referring to FIG. 16. FIG. 16 illustrates that grooves 56a to 56h are formed in the belt 8 of the magazine 2 shown in FIG. 1. Explanations of the codes in FIG. 15 which are the same as those shown in FIG. 1 will be omitted. Portions of the belt 8 which are in contact with the optical discs 5a to 5h are provided with the grooves 56a to 56h, respectively. Preferably, each depth of the grooves 56a to 56h is within the non-recordable area 19 (FIG. 3) of the optical disc 5. The protrusion between adjacent grooves formed in the belt 8 has the width larger than the thickness of the partition 4 so that the optical disc 5 is not in contact with the partition 4.

The disc moving mechanism such as the spring plate 26 and the slide plate 32 shown in FIGS. 9, 10, 11 may be provided for moving the optical disc 5 so as to be in contact with or away from the carriage belt 8.

This makes it possible to prevent leaning of the optical disc 5 so that the contact between the recording area of the optical disc 5 and the partition 4 is avoided, thus preventing damage.

Ninth Embodiment

Figure 17:
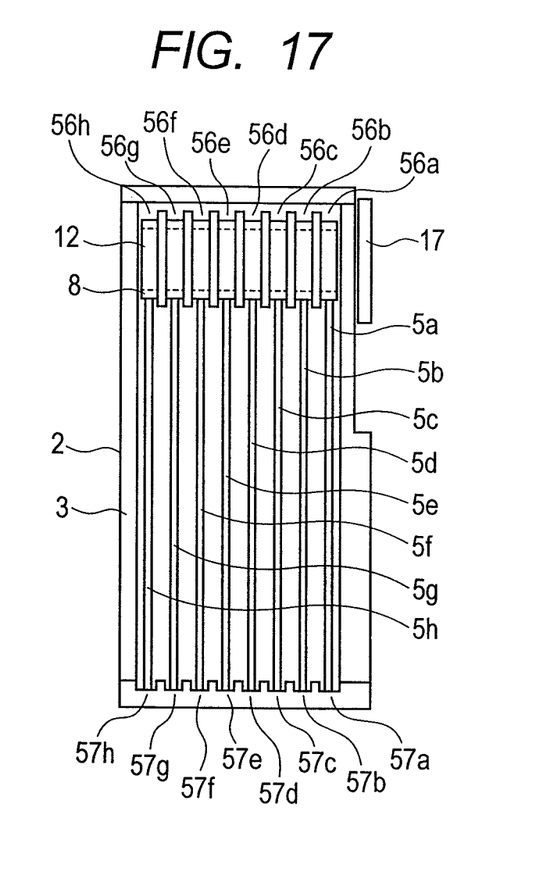
FIG. 17 illustrates a magazine 2 according to another exemplary embodiment of the present invention.

Another exemplary embodiment of the magazine 2 according to the present invention will be described referring to FIG. 17. FIG. 17 illustrates that grooves 57a to 57h are formed in the casing 3 of the magazine 2 shown in FIG. 16 while omitting the partition 4. Explanations of the codes in FIG. 17 which are the same as those shown in FIG. 16 will be omitted. The grooves 56a to 56h are formed in the portion of the belt 8 in contact with the optical discs 5a to 5h. The grooves 57a to 57h are formed in the casing 3 at the positions opposite the grooves 56a to 56h. Preferably, each depth of the grooves 56a to 56h and grooves 57a to 57h is set to be within the width of the non-recordable area 19 (FIG. 3) of the optical disc 5. The optical discs 5a to 5h are stored in the portions defined by the grooves 56a to 56h, and 57a to 57h, respectively. The partition 4 may be omitted. The disc moving mechanism such as the spring plate 26 and the slide plate 32 shown in FIGS. 9, 10, 11 may be provided for moving the optical disc 5 so as to be in contact with or away from the disc carriage belt 8.

As no partition 4 is used, and accordingly is not in contact with the recording area of the optical disc 5, the optical disc may be protected from being damaged. The storage interval of the optical disc 5 may be reduced, thus increasing the number of the optical discs to be stored.

The magazine 2 and the disc changer 1 as described in the exemplary embodiments are structured to vertically carry the optical discs 5. However, the disc changer may be rotated at 90° for horizontally carrying the optical discs 5.

The present invention is not limited to the exemplary embodiments as described above, and may contain various types of modified examples. The exemplary embodiment describes the present invention in detail for the purpose of easy understanding, and is not limited to the one provided with all the structures as described above. It is possible to replace a part of the structure of the exemplary embodiment with the other structure of the exemplary embodiment. It is also possible to add the structure of another exemplary embodiment to the structure of a specific embodiment. The other structure may be added, omitted, and replaced with respect to the other structure for a part of the structure of each of the exemplary embodiment.

Each structure, function, processing unit and processing mechanism as described above may be partially or entirely realized using the hardware, for example. The respective structure, function and the like may be realized using software by interpreting and executing the program for implementing the respective functions. The information for realizing the functions such as program, table and file may be stored in the recording device such as memory, hard disk, SSD (Solid State Drive) or recording medium such as IC card, SD card and DVD.

The control line and the information line which are considered as necessary for explanation are shown, and do not necessarily represent all the control line or information in consideration of the product. It may be considered that almost all the structures are actually interconnected.

What is claimed is:

1. A disc changer having an optical disc storage magazine, comprising:
    a member for dividing the magazine into sections which allow storage of a plurality of optical discs;
    a disc carriage belt in contact with each outer circumferential surface of the plurality of optical discs stored in the magazine for rotating and moving;
    a recording/reproducing device;
    a disc control plate, which is disposed between the optical disc storage magazine and the recording/reproducing device, the disc control plate having a slit which allows only one of the optical discs stored in the optical disc storage magazine to pass therethrough at a time; and
    a disc carriage roller for carrying the optical disc, which is disposed between the optical disc storage magazine and the recording/reproducing device;
    wherein among the plurality of optical discs taken from the optical disc storage magazine through rotating movement via the disc carriage belt, the optical disc which has passed through the slit is carried to the recording/reproducing device with the disc carriage roller for recording/reproducing, and the other optical discs are stopped while abutting against the disc control plate; and
    wherein the optical disc storage magazine is detachably installed in the disc changer.

2. The optical disc storage magazine according to claim 1, further comprising a disc moving mechanism provided opposite the disc carriage belt which holds the optical disc in contact with the outer circumferential surface so that the optical disc is moved in contact with or away from the disc carriage belt.

3. The optical disc storage magazine according to claim 2, wherein the disc moving mechanism includes a portion connected to an external drive source for driving the disc moving mechanism.

4. The optical disc storage magazine according to claim 1, wherein a groove is formed in the disc carriage belt at a position in contact with the outer circumferential surface of the optical disc.

5. The optical disc storage magazine according to claim 1, wherein:
- a groove is formed in the disc carriage belt at a position in contact with the outer circumferential surface of the optical disc; and
- a groove is formed in a member of the optical disc storage magazine at a position opposite the groove formed in the disc carriage belt, which is in contact with the outer circumferential surface of the optical disc.

6. The optical disc storage magazine according to claim 1, wherein the member for dividing the magazine is a partition.

7. The optical disc storage magazine according to claim 6, wherein the partition includes protrusions at a position opposite a non-recordable area of the optical disc at both sides and a semicircular portion of a storage terminal end of the partition in a moving direction of the optical disc in the optical disc storage magazine.

8. The optical disc storage magazine according to claim 1, wherein the disc carriage belt includes a portion connected to an external drive source for rotating and driving the disc carriage belt.

9. The optical disc storage magazine according to claim 1, further comprising a cover attached to an insertion portion of the optical disc storage magazine through which the optical disc is inserted.

10. The disc changer according to claim 1, wherein a plurality of the optical disc storage magazines are arranged in parallel.

11. The disc changer according to claim 1, wherein the disc control plate has a plurality of slits opposite the optical disc storage magazines, the disc changer comprising the disc carriage rollers for carrying the optical discs which have passed through the slits; and
- the recording/reproducing devices for recording/reproducing the optical discs which have been carried by the disc carriage rollers.

12. The disc changer according to claim 1, further comprising a carriage on which the disc control plate, the disc carriage roller and the recording/reproducing device are mounted, wherein the carriage is moved to locate the slit of the disc control plate at a position opposite the optical disc stored in the optical disc storage magazine.

13. The disc changer according to claim 1, further comprising a carriage on which the optical disc storage magazine is mounted, wherein the carriage is moved to locate the optical disc stored in the optical disc storage magazine at a position opposite the slit of the disc control plate.

14. The disc changer according to claim 1, wherein a roller portion of the disc carriage roller, which is in contact with a surface of the optical disc is divided into a plurality of sections.

15. The disc changer according to claim 1, wherein a drive roller of the disc carriage roller is brought into contact with a non-recordable surface, and a driven roller is brought into contact with a recordable surface.

* * * * *